United States Patent Office 3,445,506
Patented May 20, 1969

3,445,506
METHOD FOR PREPARING ETHYL ACRYLATE
Stephen Sogal, Avon Lake, Ohio, assignor to The B. F. Goodrich Company, New York, N.Y., a corporation of New York
No Drawing. Filed Jan. 21, 1966, Ser. No. 522,021
Int. Cl. C07c 67/00, 103/08
U.S. Cl. 260—486                                  6 Claims

ABSTRACT OF THE DISCLOSURE

Ethyl acrylate is prepared by reacting acrylamide sulfate with ethyl sulfates in an integrated process whereby by-product diethyl ether, acrylic acid, beta-ethoxy ethyl propionate and ethanol formed during the reaction, along with unreacted sulfuric acid, may be recycled and utilized in the process. The acrylamide sulfate and sulfates are readily prepared by reaction of acrylonitrile and ethylene with sulfuric acid.

---

This invention relates to production of ethyl acrylate and relates more particularly to the preparation of ethyl acrylate by means of an improved process based on acrylonitrile, sulfuric acid and ethylene comprising esterifying acrylamide sulfate with ethyl sulfate to form ethyl acrylate in good yield.

Several methods are known for preparing alkyl esters of acrylic acid from acrylonitrile. In one such process acrylonitrile is reacted with water in the presence of an acid and the reaction product formed further reacted with an alcohol to provide the alkyl ester. Another method involves a batch reaction of a nitrile, an olefin and sulfuric acid to provide an alkyl ester. The latter process, which is of interest because of the potential use of ethylene rather than ethanol, has not been commercially used because of the long reaction times required and low yields of desired product. Processes based on ethylene rather than ethanol are desirable for economic reasons.

Accordingly, it is an object of this invention to provide an improved and integrated process for preparing ethyl acrylate on a commercial scale from ethylene and acrylonitrile. It is another object of this invention to provide a commercial process for preparing ethyl acrylate without formation of excessive amounts of expensive by-products which are difficult to remove and must be discarded. It is still another object of this invention to provide an improved and economical process for preparing ethyl acrylate using acrylonitrile, ethylene and sulfuric acid as starting materials to provide a maximum yield of ethyl acrylate with a minimum loss of raw materials as unused by-products.

These and other objects of the invention are realized by a process comprising reacting acrylonitrile with sulfuric acid to form acrylamide sulfate, reacting ethylene with sulfuric acid to provide ethyl sulfates, then reacting the acrylamide sulfate with the ethyl sulfates to form ethyl acrylate in an integrated process whereby the by-product diethyl ether, acrylic acid, beta-ethoxy ethyl propionate and ethanol which are formed during the reaction, and unreacted sulfuric acid, may be recycled and utilized in the process as described more in detail hereinafter.

While the reactions may be begun with new or fresh sulfuric acid, in the operation of the process recycle sulfuric acid becomes available and is used in forming acrylamide sulfate. While theoretically only one mol of sulfuric acid is required to obtain one mol of ethyl acrylate from acrylonitrile and ethylene according to stoichiometric equations, the process of this invention is utilized more efficiently by using excess sulfuric acid in the various steps. Excess sulfuric acid increases undesired ammonium bisulfate as a by-product of the esterification reaction and unless the unreacted sulfuric acid can be recycled as it is in accordance with this invention, the costs of the process become excessive. In this process only about one pound of sulfuric acid and oleum per pound of ethyl acrylate obtained is used as compared to a predicted use of about two pounds of sulfuric acid per pound of ethyl acrylate, as well as only ½ as much ammonium sulfate actually formed. The recovered sulfuric acid may be brought to the desired strength during the recycle operation by heating under vacuum to reduce the water content thereof.

The acrylamide sulfate is readily prepared by reacting acrylonitrile with, normally, a molar excess of sulfuric acid in a concentration of greater than 70% acid. Acids of concentrations from above 75 to 85% are normally used. The acrylonitrile is preferably added to a vigorously agitated sulfuric acid solution in a reactor at an elevated temperature. The reaction is exothermic and usually is controlled at a temperature of about 100° C.

Ethyl sulfates are obtained by reacting sulfuric acid and ethylene and/or reacting oleum and sulfuric acid with recycled diethyl ether and ethylene. In a first step, ethylene is charged to the reactor containing fresh 96% sulfuric acid, at a pressure of about 160 p.s.i.g. or higher, until the acid content of the charge is reduced to about 35% sulfuric acid, depending on the concentration of ethyl sulfate desired. When recycled diethyl ether is included in the process, the ethyl sulfate reactor is charged with sulfuric acid and oleum (65%) and the recycled diethyl ether is charged to the reactor to obtain the initial ethyl sulfates. The temperature is then adjusted to 50 to 70° C. and additional ethylene charged to the reactor under pressure to obtain the desired ethyl sulfates for further reaction.

To esterify the acrylamide sulfate, the acrylamide sulfate is diluted with water and cooled to about 50 to 70° C. By this technique, the subsequent formation of large amounts of diethyl ether and ethylene on addition of ethyl sulfate is greatly reduced. If the acrylamide sulfate solution is not diluted and cooled the formation of diethyl ether and ethylene takes place to a degree to make the process uneconomical. The amount of dilution may be varied from about four to about eight, preferably five to six mols of water per mol of acrylamide sulfate as a diluent. Put another way, the concentration of arcylamide sulfate in water and acid preferably should be from about 40 to about 45%. The ethyl sulfates are then charged to the reactor and the temperature of the reactor raised to about 90–100° C. During this heating period ethyl acrylate, some water, ethanol and diethyl ether vaporize and are removed from the reactor and are condensed. The reactor temperature is then increased to about 120° C. with superheated recycled ethanol and water from previous runs and then raised to about 150° C. to steam strip the remainder of the organic reactants and products present in the reactor. The diethyl ether is separated from the ethyl acrylate in a still and recycled to an ethyl sulfate reactor. The ethanol is extracted with water and recycled as described to sparge the reactor and the ethyl acrylate is distilled to provide polymerization grade ethyl acrylate. The high boilers from this distillation are also recycled. The residue from the reactor which is ammonium bisulfate and sulfuric acid, is centrifuged to separate ammonium bisulfate from sulfuric acid. The acid is then recycled as described above.

100 to 500 p.p.m. copper sulfate or ferrous sulfate have been found to be satisfactory inhibitors of polymerization during the preparation of acrylamide sulfate and during reaction of acrylamide sulfate with ethyl sulfate. The condensed reaction products are stabilized with known polymerization inhibitors during recovery and purification of ethyl acrylate on a basis of about 10 to 1000 p.p.m., usually 25 to 250 p.p.m. of organic stabilizer such as hydroquinone may be used.

Specific embodiments of the invention are now described.

Example I

A sulfuric acid solution is prepared, which may be fresh and/or recycled acid, diluted to 85% concentration with a 2% aqueous ferrous sulfate solution. The acid was charged to a reactor and maintained at a temperature, in the range of about 96 to 100° C. Acrylonitrile was charged to sulfuric acid solution in the reactor with vigorous agitation. The acrylonitrile was charged over a 1.1 hour period and was held for an additional hour so that a complete reaction in converting the acrylonitrile to acrylamide sulfate was obtained. The molar ratio of acrylonitrile to sulfuric acid to water was 1.02 mols of sulfuric acid and 1.32 mols of water per mol of acrylonitrile. The ethyl sulfate was prepared by reacting 1.22 mols of fresh 96% sulfuric acid at 50 to 70° C. with ethylene by passing ethylene into the reactor under a pressure of at least 160 p.s.i.g. 1.33 mols of ethylene reacted with sulfuric acid. The acrylamide sulfate solution was diluted with 5.9 mols of water per mol of acrylamide sulfate and cooled to about 60 to 70° C. and the ethyl sulfate charged to the reactor which was then heated to about 125° C. in about one half hour. At about 100° C. product begins to vaporize from the reactor including ethyl acrylate, diethyl ether, water and ethanol. Superheated vapors of recycle alcohol and water were then admitted to the reactor through a sparger and the temperature raised from about 126° C. to about 140° C. and the ethyl acrylate, alcohol, ether and other materials which volatilized were condensed. The reaction mixture was then steam stripped at 148° C. for about one half hour. The diethyl ether was separated from the ethyl acrylate by distillation, the ethanol by extraction with water, and the ethyl acrylate fractionated to provide a product having a purity of about 99%. The acrylic acid and other high boilers are returned to the esterification reactor. The steam stripped residue remaining in the reactor after steam distillation contained unreacted sulfuric acid and aqueous ammonium bisulfate. This was removed from the reactor and allowed to cool so that the ammonium bisulfate would crystallize. The crystals were separated by filtration and the sulfuric acid was recycled for the reaction with acrylonitrile after stripping the water therefrom to increase the concentration of the sulfuric acid. The yield of ethyl acrylate based on acrylonitrile was 87%.

High boiling acrylic acid and beta-ethoxy ethyl propionate which are separated during purification of the ethyl acrylate by fractionation are also recycled and introduced into the esterification reactor with the recycle sulfuric acid and this step markedly reduces the net make of these undesired by-products and improves the utilization of acrylonitrile.

Example II

In another run, following the general procedure of Example I set forth above, on a molar basis, one mol of acrylonitrile was reacted with 0.98 mol of recycled sulfuric acid which had been concentrated to 85% acid by heating under vacuum and contained 200 p.p.m. ferrous sulfate. The resulting acrylamide sulfate was diluted on a basis of one mol of acrylamide sulfate with 5.9 mols of water. The ethyl sulfates were prepared as described with, on a molar basis, 1.29 mols of sulfuric acid and 1.55 mols of ethylene. A yield of 90% ethyl acrylate based on the acrylonitrile was obtained, an unexpected increase from use of recycle sulfuric acid which contained high boiling impurities.

Example III

In still another run performed as described in Example I, 1.02 mols of sulfuric acid was reacted with 1 mol of acrylonitrile in a ratio of 1.02 mols of sulfuric acid, 1.6 mol of water and 1 mol of acrylonitrile and the resulting product diluted with 5.3 mols of recycle water which contained 0.15 mol of acrylic acid and 0.04 mol of beta-ethoxy ethyl propionate, which are reaction by-products and are recovered in the purification of ethyl acrylate, and cooled to 70° C. 0.3 mol of diethyl ether which may be separated in a still in the purification of ethyl acrylate was reacted with a mixture of 1 part oleum (64%) and 3 parts of 96% sulfuric acid, and thereafter this mixture was treated with ethylene at 160 p.s.i.g. at a temperature in the range of 42° C. to 57° C. until the ethylene had reacted with about 60% of the sulfuric acid to provide ethyl sulfates. After the esterification reaction and purification as described in Example I, ethyl acrylate in a yield of 86% based on acrylonitrile was obtained with less acrylic acid and beta-ethoxy-ethyl propionate being formed than when these latter two materials were not recycled.

I claim:

1. A method for preparing ethyl acrylate from acrylonitrile, ethylene and sulfuric acid which comprises reacting acrylonitrile with sulfuric acid to form acrylamide sulfate, reacting ethylene with sulfuric acid to form ethyl sulfate, mixing said acrylamide sulfate in dilute aqueous solution at a temperature below about 85° C. with said ethyl sulfates, then heating the resulting mixture to a temperature above 100° C. and recovering ethyl acrylate.

2. The method of claim 1 wherein the reaction of acrylonitrile with excess sulfuric acid is controlled at a temperature of about 90–110° C., ethylene is reacted with sulfuric acid at a temperature of about 50 to 70° C. under a pressure greater than about 100 p.s.i.g., diluting said acrylamide sulfate with water and cooling to a temperature of about 50 to about 70° C. prior to reaction with ethyl sulfate, and heating the reaction mixture of acrylamide sulfate and ethyl sulfate to about 150° C. while stripping with steam.

3. The method of claim 2 wherein acrylamide sulfate is formed by adding acrylonitrile to sulfuric acid having a concentration of about 85%, and diluting the resulting acrylamide sulfate with 4 to 8 mols of water per mol of acrylamide sulfate.

4. The method of claim 1 wherein diethyl ether, acrylic acid and beta-ethoxy ethyl propionate formed during said reaction of acrylamide sulfate and ethyl sulfate, and unreacted sulfuric acid, are recovered and recycled in making additional ethyl acrylate by reacting said recycled sulfuric acid with acrylonitrile, recycling said acrylic acid and beta-ethoxy ethyl propionate to the reactor where acrylamide sulfate and ethyl sulfate are reacted, and preparing additional ethyl sulfates for recycling to said reactor by reacting diethyl ether with sulfuric acid and oleum to form ethyl sulfate.

5. The method of claim 4, on a continuous basis, wherein said acrylamide sulfate is formed by adding acrylonitrile to about 85% concentrated sulfuric acid containing 200 to 500 parts per million of copper sulfate and iron sulfate and water in a molar ratio of one mol of acrylonitrile, 1 to 2 mols of about 85% fresh or recycle sulfuric acid, ethylene is reacted with about 96% sulfuric acid at a temperature of about 50 to 70° C. under pressure in the range of about 160 p.s.i.g., said acrylamide sulfate is diluted with 4 to 7 mols of water per mol of acrylamide sulfate and cooled to a temperature of about 50 to 70° C. prior to reaction with ethyl sulfate, the reaction mixture of acrylamide sulfate and ethyl sulfate is heated to about 120° C., further heated to about 140° C. with superheated recycle ethanol and steam and stripped at about 145 to 150° C. with steam, wherein the volatile reaction products are recovered and diethyl ether is separated from ethyl acrylate by distillation and reacting said diethyl ether with sulfuric acid and oleum to form ethyl sulfate for recycle in preparing additional ethyl acrylate, high boiling acrylic acid and beta-ethoxy ethyl propionate reaction by-products are separated from ethyl acrylate by distillation and recycled to the acrylamide sulfate and ethyl sulfate reactor, and sulfuric acid is recovered from said reactor, concentrated and recycled for use in preparing additional acrylamide sulfate.

6. A method for preparing ethyl acrylate which comprises reacting acrylamide sulfate and ethyl sulfate by mixing ethyl sulfate with acrylamide sulfate in dilute aqueous solution at a temperature below 85° C. and heating the mixture to a temperature above 100° C. and recovering ethyl acrylate.

References Cited

UNITED STATES PATENTS

| 2,056,771 | 10/1936 | Crawford | 260—486 |
| 2,408,940 | 10/1946 | Mahan | 260—486 |
| 2,816,135 | 12/1957 | Healy | 260—486 |

FOREIGN PATENTS

| 1,332,186 | 6/1963 | France. |

LORRAINE A. WEINBERGER, *Primary Examiner.*

ALBERT P. HALLUIN, *Assistant Examiner.*